(No Model.)
C. A. ANDERSON.
CULTIVATOR SHOVEL.
No. 436,911. Patented Sept. 23, 1890.
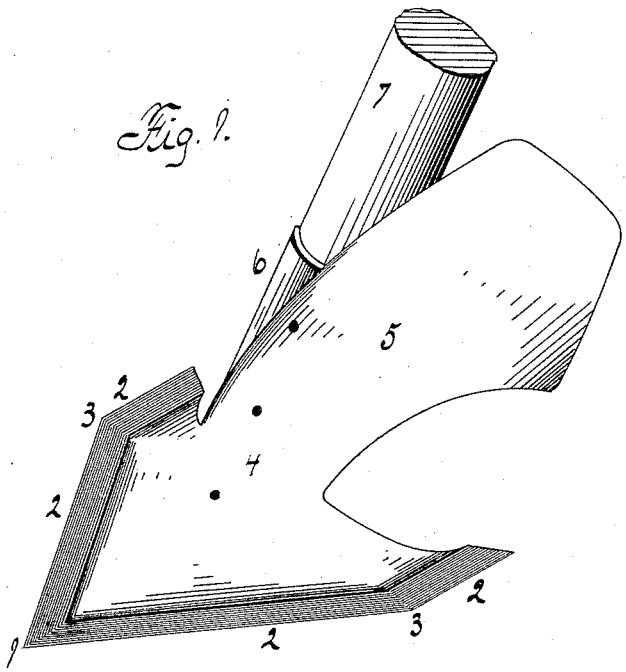
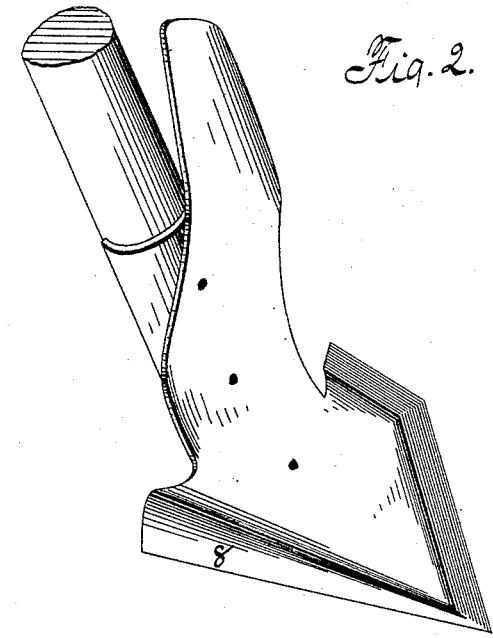
Witnesses:
Evans Blake
E. Behel.
Inventor:
Charles A. Anderson
By A. O. Behel
Atty.

UNITED STATES PATENT OFFICE.

CHARLES A. ANDERSON, OF ROCKFORD, ILLINOIS.

CULTIVATOR-SHOVEL.

SPECIFICATION forming part of Letters Patent No. 436,911, dated September 23, 1890.

Application filed August 15, 1889. Renewed July 21, 1890. Serial No. 359,359. (No model.)

*To all whom it may concern:*

Be it known that I, CHARLES A. ANDERSON, a citizen of the United States, residing at Rockford, in the county of Winnebago and State of Illinois, have invented certain new and useful Improvements in Cultivator-Shovels, of which the following is a specification.

The object of this invention is to construct a cultivator-shovel provided with laterally-extending wings, a mold-board, and a space between the wings and mold-board.

In the accompanying drawings, Figure 1 is an isometrical representation of a shovel embodying my invention. Fig. 2 shows a modification of my invention.

The shovel shown at Fig. 1 is made from sheet metal, and from the point 1 extend wings 2 on either side until they reach a point 3, when they extend rearward for a short distance. The points 1 and 3 are all on the same plane. From the point 1 the center of the shovel rises to a point 4, and at which point the mold-board 5 curves rearward and upward, as clearly shown. To the rear side of the mold-board is riveted a curved socket 6, and which receives the shovel-standard 7, to which it is secured. By this construction of a cultivator-shovel I am able to cut the weeds at any desired uniform depth, and the mold-board will turn a greater portion of the soil. By the rise in the lengthwise center of the shovel and the cut-away portion thereof the dirt will be turned over and pulverized.

The shovel represented at Fig. 2 in the drawings is substantially the same as Fig. 1, excepting the wings are of different lengths, and the wing 8 is nearly in a line with the lengthwise direction of the shovel and turns down more abruptly, forming a landside to the shovel. This shovel is secured to the standard in the same manner as the shovel represented at Fig. 1.

I claim as my invention—

A cultivator-tooth made from sheet metal and having laterally-projecting wings on the same plane with the point of the shovel, the body of the shovel uprising from the point of the shovel between the said wings, a mold-board uprising from said body portion and curved rearward, and a socket, substantially as set forth.

CHARLES A. ANDERSON.

Witnesses:
A. D. BEHEL,
E. BEHEL.